(12) United States Patent
Habibvand

(10) Patent No.: US 9,227,720 B2
(45) Date of Patent: Jan. 5, 2016

(54) COMPOSITE ANNULAR SEAL ASSEMBLY FOR BEARINGS IN AIRCRAFT

(71) Applicant: Roller Bearing Company of America, Inc., Oxford, CT (US)

(72) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/294,947

(22) Filed: Jun. 3, 2014

(65) Prior Publication Data

US 2014/0339369 A1 Nov. 20, 2014

Related U.S. Application Data

(63) Continuation-in-part of application No. 14/194,016, filed on Feb. 28, 2014.

(60) Provisional application No. 61/771,214, filed on Mar. 1, 2013.

(51) Int. Cl.
*B64C 9/02* (2006.01)
*F16C 33/78* (2006.01)
(Continued)

(52) U.S. Cl.
CPC ............... *B64C 9/02* (2013.01); *F16C 33/783* (2013.01); *F16C 33/7806* (2013.01); *F16C 33/7843* (2013.01); *F16C 33/7889* (2013.01); *F16C 23/086* (2013.01); *F16C 33/36* (2013.01)

(58) Field of Classification Search
CPC ..... B64C 9/02; F16C 33/783; F16C 33/7889; F16C 33/7803; F16C 33/7843; F16C 33/767; F16C 33/78; F16C 33/36; F16C 23/086
See application file for complete search history.

(56) References Cited

U.S. PATENT DOCUMENTS 1,376,311 A 4/1921 Armstrong
1,795,471 A 3/1931 Buckwalter
(Continued)

FOREIGN PATENT DOCUMENTS

CA 2780513 A1 5/2011
EP 0189365 A1 7/1986
(Continued)

OTHER PUBLICATIONS

International Search Report issued for PCT/US2014/019522, dated Jun. 6, 2014.
(Continued)

*Primary Examiner* — Valentina Xavier
(74) *Attorney, Agent, or Firm* — MKG, LLC

(57) ABSTRACT

An edge flap arrangement is provided for an aircraft wing and includes a main flap element and an actuator for moving the main flap element relative to the wing. A linkage arrangement supports the main flap element from the aircraft wing for movement relative to the wing, and includes including a drop hinge link arrangement having a fixed strut secured to the aircraft wing and a drop link secured to the main flap element. The fixed strut and drop link are pivotally connected by a hinge point having a bearing installed therein. The bearing includes an outer race, an inner race and an annular seal assembly snap-fit into the outer race. The annular seal assembly includes first and second annular retaining rings and a resilient ring disposed between the first and second annular retaining rings.

14 Claims, 8 Drawing Sheets

(51) Int. Cl.
*F16C 23/08* (2006.01)
*F16C 33/36* (2006.01)

(56) References Cited

U.S. PATENT DOCUMENTS

| | | | |
|---|---|---|---|
| 1,902,662 A | 3/1933 | Phelps | |
| 2,254,304 A | 9/1941 | Miller | |
| 2,387,962 A | 10/1945 | Williams | |
| 2,728,616 A | 12/1955 | Potter | |
| 2,764,432 A * | 9/1956 | Leister et al. | 277/402 |
| 2,767,037 A | 10/1956 | Williams | |
| 3,792,912 A | 2/1974 | Howe, Jr. et al. | |
| 4,333,694 A | 6/1982 | Howe, Jr. | |
| 4,725,026 A * | 2/1988 | Krafka et al. | 244/219 |
| 5,413,416 A | 5/1995 | Grunze et al. | |
| 5,441,351 A | 8/1995 | Grunze et al. | |
| 5,582,483 A | 12/1996 | Grunze et al. | |
| 6,394,656 B1 | 5/2002 | Williams | |
| 8,006,940 B2 | 8/2011 | Zeumer | |
| 8,061,903 B2 | 11/2011 | Kolar | |
| 8,070,106 B2 | 12/2011 | Engelbrecht et al. | |
| 8,220,743 B2 | 7/2012 | McAlinden | |
| 8,302,913 B2 | 11/2012 | Schlipf | |
| 8,302,914 B2 | 11/2012 | Zeumer | |
| 8,398,019 B2 | 3/2013 | Schilpf | |
| 8,511,611 B2 | 8/2013 | Blades | |
| 8,534,612 B2 | 9/2013 | Morris | |
| 8,567,727 B2 | 10/2013 | Morris | |
| 8,651,428 B2 | 2/2014 | Parker | |
| 8,714,493 B2 | 5/2014 | Morris | |
| 2003/0001444 A1 | 1/2003 | Coles et al. | |
| 2005/0058382 A1 | 3/2005 | Williams | |
| 2008/0040886 A1 | 2/2008 | Arnold et al. | |
| 2010/0032520 A1 * | 2/2010 | Mauran et al. | 244/99.4 |
| 2011/0127385 A1 * | 6/2011 | Morris | 244/216 |
| 2013/0087662 A1 | 4/2013 | Soenarjo | |

FOREIGN PATENT DOCUMENTS

| | | |
|---|---|---|
| EP | 1092883 A2 | 4/2001 |
| EP | 2035275 B1 | 7/2007 |
| EP | 2046650 B1 | 8/2007 |
| EP | 2266877 A2 | 12/2010 |
| EP | 2567109 A1 | 11/2011 |
| EP | 2589829 A1 | 5/2013 |
| JP | H10141380 A | 5/1998 |
| WO | 2011093922 A2 | 8/2011 |
| WO | 2011140230 | 11/2011 |

OTHER PUBLICATIONS

International Preliminary Report on Patentability issued for PCT/US2014/019522, dated Jan. 26, 2015.

* cited by examiner

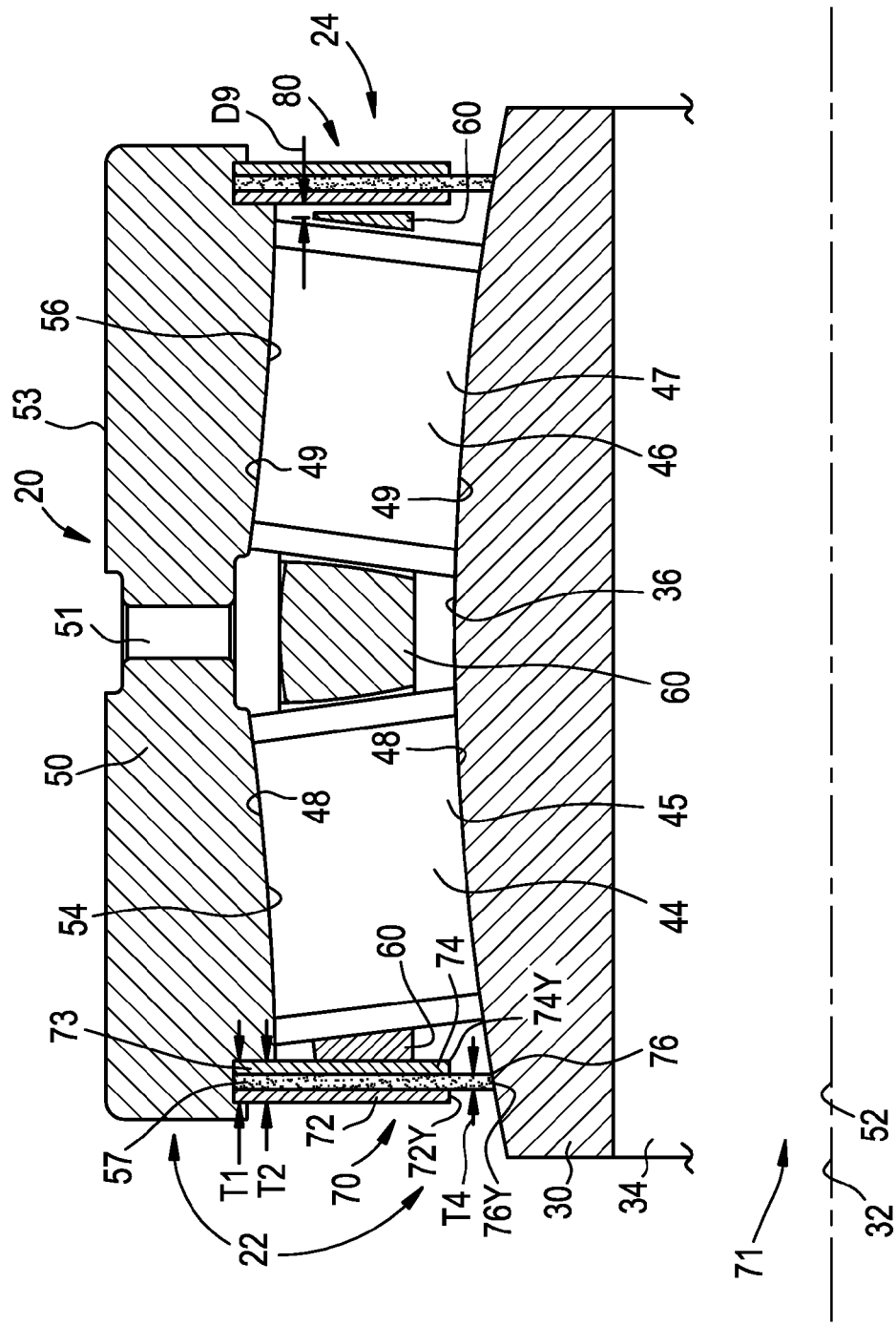

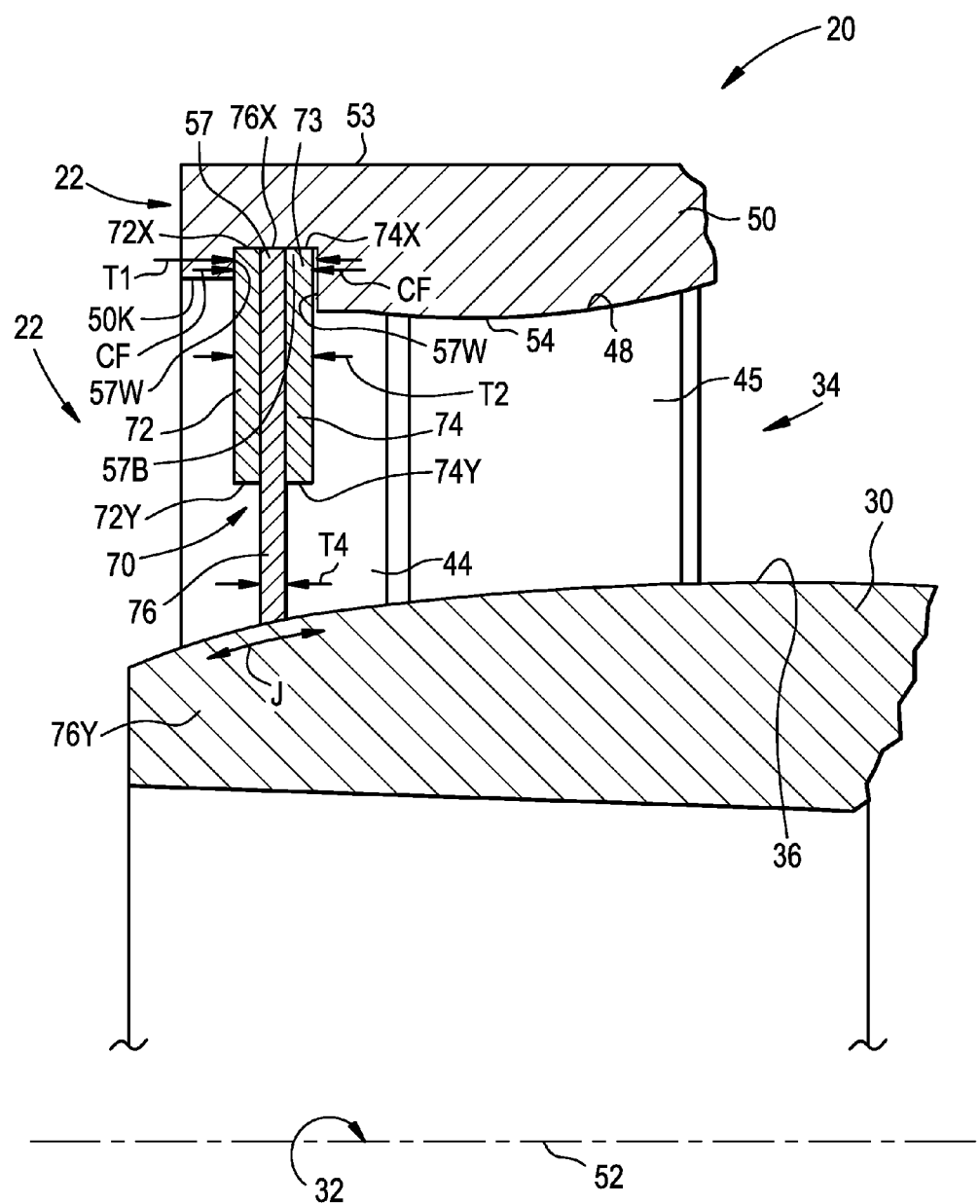

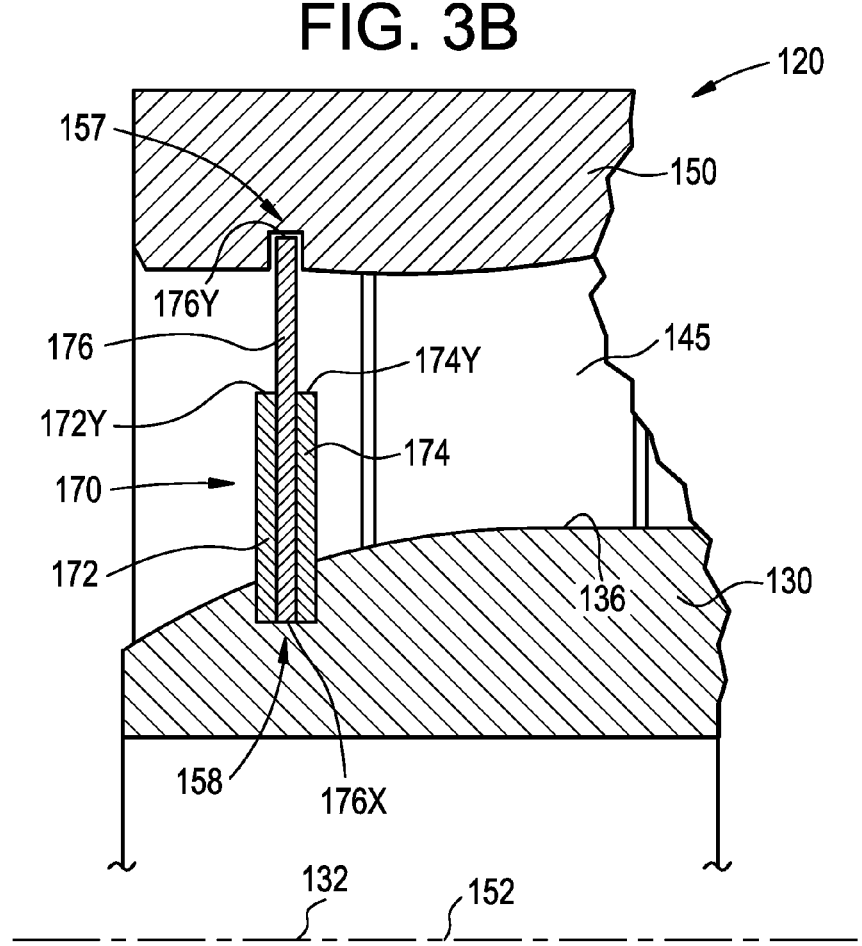
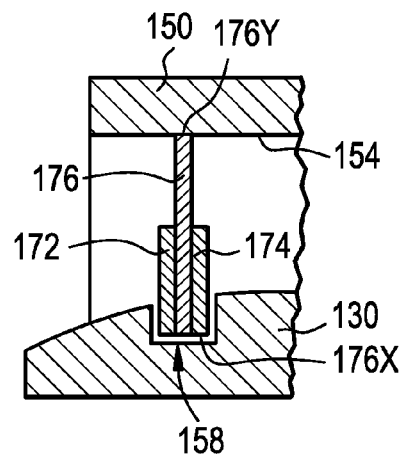

COMPOSITE ANNULAR SEAL ASSEMBLY FOR BEARINGS IN AIRCRAFT

CROSS REFERENCE TO RELATED APPLICATIONS

This application is a Continuation in Part of and claims priority to U.S. patent application Ser. No. 14/194,016, entitled "Composite Annular Seal assembly for Bearings," and filed Feb. 28, 2014, which claims priority to U.S. Provisional Patent Application Ser. No. 61/771,214, entitled "Sandwich Seal Design for Hourglass Roller Bearing," and filed Mar. 1, 2013, the subject matter of both of which are incorporated herein by reference.

FIELD OF THE INVENTION

The present invention relates generally to a composite seal for use in bearings and more particularly to a composite annular seal assembly having a resilient ring disposed between (e.g., sandwiched between) two annular retaining rings, for use in hourglass type bearings for use in aircraft and more particularly in a drop linkage assembly of a trailing edge flap arrangement of such aircraft.

BACKGROUND OF THE INVENTION

There are many types of bearings that are used in various applications. Such bearings include journal bearings, roller bearings, spherical bearings and hourglass type bearings. In general, these bearings have an inner race that is disposed at least partially in an outer race. The inner race and outer race are movable relative to one another. There is an annular cavity between the inner race and the outer race that typically contains a lubricant. One well known problem with bearings is the ingress of debris and contaminants into the annular cavity which can cause premature failure of the bearings due to degradation of the lubrication. Moreover, operation of the bearing can cause the lubricant to inadvertently escape from the annular cavity.

In an effort to mitigate the aforementioned problems, seals have been positioned across the annular cavity to maintain the lubricant in the cavity and to prevent the ingress of debris into the annular cavity. However, during operation, such seals become dislodged from the bearing and fail to function. In addition, such seals have often been too flexible, thereby allowing the seal to glide over debris and sweep the debris into the annular cavity.

Bearings are typically used in aircraft wing flap arrangements. For example, U.S. Pat. No. 8,714,493 describes a trailing edge flap arrangement for an aircraft wing that includes a drop linkage arrangement that includes one or more bearings. The subject matter of U.S. Pat. No. 8,714,493 is incorporated by reference herein, in its entirety. U.S. Pat. No. 8,714,493 is assigned to Airbus® Operations Limited, Bristol United Kingdom.

One of Airbus's® aircraft that employees the drop linkage arrangement is known as the Airbus® and A-350® aircraft. Airbus® and A-350® are a registered trademarks of Airbus Corporation, having numerous registered trademarks therefor. The Airbus® A-350® aircraft is defined by a wing planform—with a 64.7-meter wingspan, a total area of 442 square meters, and high swept leading edge. The Airbus® and A-350® aircraft includes a drop-hinge linkage mechanism to improve wing flap deployment kinetics, along with the introduction of a downwards movement for the upper wing spoilers to fill the gaps that occur when flaps are extended. In addition, the Airbus® and A-350® aircraft includes flight computer performs in-flight trimming of the inboard and outboard flaps, creating a variable camber wing that adapts to different flight conditions. In one embodiment, the Airbus® and A-350® aircraft employs 53 per cent of composites (i.e., Carbon Fiber Reinforced Plastic) in the fuselage and wing to reduce the need for fatigue-related inspections required on more traditional aluminum jetliners. The Airbus® and A-350® aircraft has a seating capacity between 280-440. The Airbus® and A-350® aircraft has two engines (e.g., two Rolls-Royce Trent XWB engines). The Airbus® and A-350® aircraft has a flying range of up to 7,950 nautical miles.

SUMMARY OF THE INVENTION

There is disclosed herein an edge flap arrangement for an aircraft wing, the arrangement comprising: a main flap element and an actuator for moving the main flap element relative to the wing; a linkage arrangement supporting the main flap element from the aircraft wing for movement relative to the wing, the linkage arrangement including a drop hinge link arrangement, the drop hinge link arrangement including a fixed strut secured to the aircraft wing and a drop link secured to the main flap element, the fixed strut and the drop link being pivotally connected by a hinge point; the hinge point comprising at least one bearing, the bearing comprising: an outer race having a first inner surface and an interior area; an inner race having an outer surface, a portion of the inner race being disposed in the interior area; an annular seal assembly snap-fit into the outer race, the annular seal assembly comprising: a first annular retaining ring defining a first radially outermost portion; a second annular retaining ring defining a second radially outermost portion; and a resilient ring defining a third radially outermost portion, the resilient ring being disposed between the first annular retaining ring and the second annular retaining ring; the first radially outermost portion, the second radially outermost portion and the third radially outermost portion being aligned with one another; the resilient ring projecting radially inward from the first annular retaining ring and the second annular retaining ring; and the resilient ring being more compressible and flexible than the first annular retaining ring and the second annular retaining ring.

There is further disclosed herein a bearing installed in a wing flap actuator of an aircraft, the bearing comprising: an outer race having a first inner surface and an interior area; an inner race having an outer surface, a portion of the inner race being disposed in the interior area; an annular seal assembly snap-fit into the outer race, the annular seal assembly comprising: a first annular retaining ring defining a first radially outermost portion; a second annular retaining ring defining a second radially outermost portion; and a resilient ring defining a third radially outermost portion, the resilient ring being disposed between the first annular retaining ring and the second annular retaining ring; the first radially outermost portion, the second radially outermost portion and the third radially outermost portion being aligned with one another; the resilient ring projecting radially inward from the first annular retaining ring and the second annular retaining ring; and the resilient ring being more compressible and flexible than the first annular retaining ring and the second annular retaining ring.

DESCRIPTION OF THE DRAWINGS

FIG. 1 is a cross-sectional view of a portion of a bearing in accordance with one embodiment of the present invention;

FIG. 3A is an enlarged view of a portion of the composite annular seal of FIG. 1;

FIG. 3B is an enlarged view of another embodiment of the composite annular seal of FIG. 1;

FIG. 3C illustrates an alternative to the embodiment of FIG. 3B;

These and other aspects are discussed below in more detail herein and are illustrated in the attached figures.

DETAILED DESCRIPTION OF THE INVENTION

Figure 5:
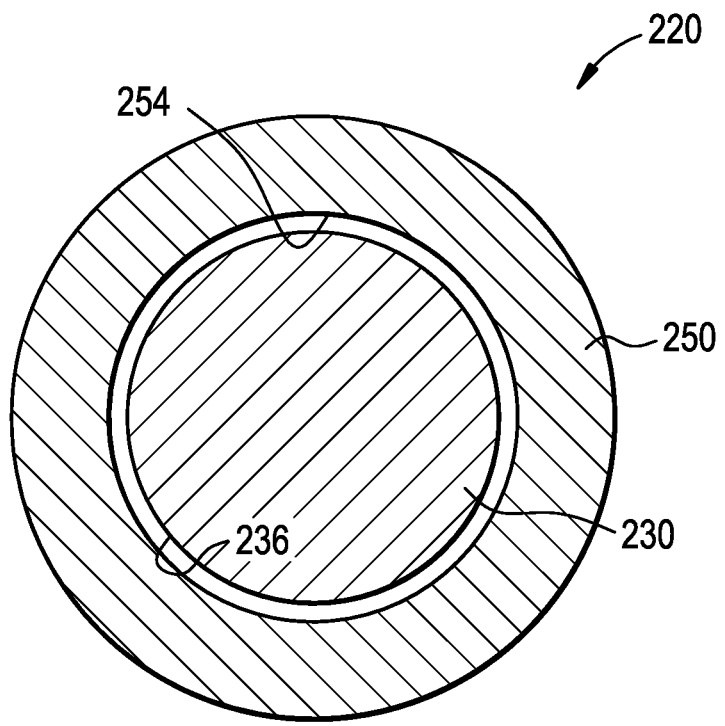
FIG. 5 is a cross sectional view of a journal bearing.

In reference to FIG. 1, a roller bearing apparatus 20 in accordance with the present invention is shown. In the embodiment illustrated in FIG. 1, the bearing 20 is an angular contact self-aligning bearing having hourglass type rollers 45, 47 as described herein. The bearing 20 has a composite annular seal assembly 70 (e.g., a sandwich seal) positioned on opposing ends thereof, as described further herein. The composite annular seal assembly 70 inhibits the ingress of contaminants into internal areas of the bearing 20 and egress of lubricant therefrom, as described herein. While the angular contact self-aligning bearing having hourglass type rollers is shown and described, the present invention is not limited in this regard as the composite annular seal assembly 70 may be employed with any type of bearing including but not limited to rolling bearings having balls and/or rollers, spherical plain bearings and journal bearings (see e.g., FIG. 5).

As shown in FIG. 1, the bearing 20 includes an inner race 30 and an outer race 50. The inner race 30 includes an inner race surface 36. The inner race surface 36 is generally convex. The inner race 30 defines a bore 34 extending therethrough. In some embodiments, the bore 34 may be coaxial with a central axis 32 of the inner race 30. In other embodiments, the bore 34 may be parallel to and radially displaced from the central axis 32 of the inner race 30, i.e. eccentric. A shaft (not shown) may be received in the bore 34. The shaft may be fixed about the central axis 32 relative to the inner race 30 by, for example, an interference fit between the shaft and the bore 34. It should be understood that although an interference fit is described in reference to the embodiment shown in FIG. 1, the present invention is not limited in this regard and the shaft may be fixed relative to the bore 34 of the inner race 30 using other known techniques, including, for example, welding, thermal installation, pinning, or by providing a bore and shaft with similarly shaped angular cross-sections to inhibit rotation slippage. In yet other embodiments, the inner race 30 and the shaft are the same component. In yet other embodiments, the shaft may be rotatable relative to the inner race 30.

The outer race 50 is annular about a central axis 52 of the outer race 50. The central axis 52 is coaxial with the central axis 32 of the inner race 30 when bearing is aligned. It should be understood that the central axis 32 of the inner race 30 and the central axis 52 of the outer race 50 may be parallel and laterally displaced, for example, when the bearing 20 is subject to a radial force.

In the embodiment illustrated in FIG. 1, the outer race 50 defines a first outer race surface 54 and a second outer race surface 56, and each of the first and second outer race surfaces 54, 56 is generally opposite the inner race surface 36. Each of the first and second outer race surfaces 54, 56 is generally convex. The first outer race surface 54 and the inner race surface 36 define a first raceway 44 and the second outer race surface 56 and the inner race surface 36 define a second raceway 46. While the first and second outer race surfaces 54, 56 are shown and described as being generally convex, the present invention is not limited in this regard as in the embodiment shown in FIG. 5 wherein a journal bearing 220 has a concave race surface 254 of the outer race 250 and has a pin 230 with a convex outer race surface 236.

As illustrated in FIG. 1, the bearing 20 also comprises a plurality of first rollers 45 disposed in the first raceway 44, and a plurality of second rollers 47 disposed in the second raceway 46. Each of the plurality of first rollers 45 defines a first concave outer surface 48 that generally conforms to the convex surfaces of the inner race surface 36 and the first outer race surface 54. Each of the plurality of second rollers 47 defines a second concave outer surface 49 that generally conforms to the convex surfaces of the inner race surface 36 and the second outer race surface 56. This type of roller 45, 47 is generally referred to as an hourglass roller because of its generally concave surface extending between its ends. The bearing 20 further includes a cage 60 disposed between the inner race 30 and the outer race 50. The rollers 45, 47 and the cage 60 facilitate rotation of the outer race 50 relative to the inner race 30. The cage 60 also facilitates precessing of the rollers 45, 47 so that each of the rollers 45, 47 cycle through a load zone, even though the bearing 20 may be subject to an oscillatory rotation. Although a cage 60 is shown in the FIG. 1, the present invention is not limited in this regard and a person of ordinary skill in the art and familiar with this disclosure will understand that other known methods of precessing or indexing may be employed.

The outer race 50 defines a circumference 53 which includes a plurality of equally-spaced holes 51 therethrough for receiving a lubricant. The plurality of holes 51 provide fluid communication from an area outside the outer race 50 to a cavity 40 defined by the inner race 30 and outer race 50 and including the first raceway and the second raceway 44, 46. The plurality of holes 51 allow lubricant to be introduced and maintained in the first and second raceways 44, 46.

As shown in FIG. 1, the bearing 20 includes a first composite annular seal assembly 70 at or proximate to a first end 22 of the bearing 20 and a second composite annular seal assembly 80 at or proximate to a second end 24 of the bearing 20. The composite annular seal assemblies 70, 80 facilitate retention of lubricant in the first and second raceways 44, 46 and inhibit the ingress of contaminants into the first and second raceways 44, 46. The first composite annular seal assembly 70 extends from the first outer race surface 54 to the inner race surface 36; and the second composite annular seal assembly 80 extends from the second outer race surface 56 to the inner race surface 36. The composite annular seal assemblies 70, 80 are positioned axially adjacent to the cage 60. In one embodiment as shown with respect to the second composite annular seal assembly 80, the composite annular seal assembly 80 is positioned axially adjacent to the cage 60 and spaced apart therefrom by a distance D9 as shown in FIG. 1. In one embodiment, the composite annular seal assemblies 70, 80 define a substantially flat configuration and are positioned substantially parallel to one another. The disclosed hourglass roller bearing 20 may be subject to oscillatory rotation about its central axis 32, 52. In addition, the bearing 20 is angularly displaceable. For example, the central axis 52 of the outer race 50 may become angularly displaced from the central axis 32 of the inner race 30. To the extent the bearing 20 becomes angularly displaced as a result of an external force, the bearing 20 is configured to self-align. The inventors have discovered that bearing seals currently on the marketplace tend to dislodge or fail when such a bearing is subject to such angular displacement. The inventors have discovered that the composite annular seal assembly 70, 80 disclosed in the present application overcomes one or more of these problems associated with known seals, and is better capable of retaining its position when the bearing is subject to angular displacement.

Figure 2A:
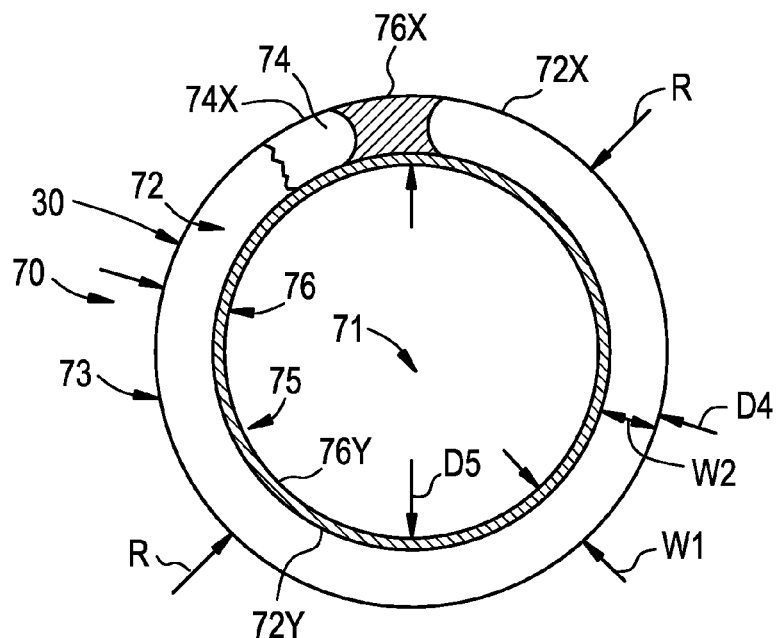
FIG. 2A is an edge view of a composite annular seal assembly for the bearing shown in FIG. 1.

As shown in FIG. 2A, the first composite annular seal assembly 70 is generally annular and defines a bore 71 extending therethrough. At least a portion of the inner race 30 extends through the bore 71 as shown in FIG. 1. The first composite annular seal assembly 70 includes a first annular retaining ring 72 and a second annular retaining ring 74. The first and second annular retaining ring 72, 74 are generally annular, have a bore extending therethrough, and are often referred to as "seal caps."

Figure 2B:
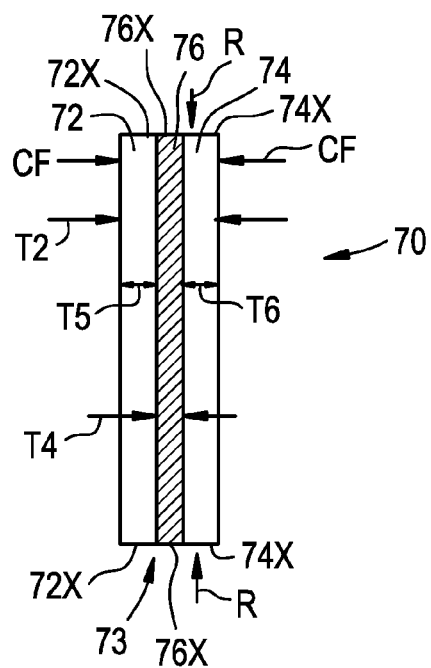
FIG. 2B is a side view of the composite annular seal assembly of the bearing shown in FIG. 2A.

Referring to FIGS. 1 and 2B, the resilient ring 76 is disposed, i.e. sandwiched, between the first annular retaining ring 72 and the second annular retaining ring 74. In the front view of the composite annular seal 70 of FIG. 2A a portion of the first annular retaining ring 72 is shown cut away to illustrate the resilient ring 76 positioned thereunder. In FIG. 2A a portion of the resilient ring 76 is cut away to illustrate the second annular retaining ring 74 thereunder. As shown in FIGS. 2A, 2B and 3A, The composite annular seal assembly 70 defines an outer radial end 73 defined by a first radially outermost portion 72X of the first annular retaining ring 72, a second radially outermost portion 74X of the second annular retaining ring 72 and a third radially outermost portion 76X of the resilient ring 76. The first radially outermost portion 72X of the first annular retaining ring 72, the second radially outermost portion 74X of the second annular retaining ring 72 and the third radially outermost portion 76X are aligned with one another at the outer radial end 73.

As best shown in FIGS. 1, 2A and 3A, the resilient ring 76 extends from the third radially outermost portion 76X radially inward to an inner radial end 76Y. The inner radial end 76Y is positioned radially inward from an inner radial end 72Y of the first annular retaining ring 72 and is positioned radially inward from an inner radial end 74Y of the second annular retaining ring 74. In one embodiment the resilient ring 76 has a width W1 and the first annular retaining ring 72 and the second annular retaining ring 74 each have a width W2. The width W2 is less than the width W1. In one embodiment, the width W2 is between about 70 percent and 90 percent of the width W1.

As shown in FIG. 1, the first end 73 of the composite annular seal assembly 70 is received in a radially inward facing groove 57 defined in the outer race 50 adjacent to or proximate the first outer race surface 54 and a lip 50K (see FIG. 3) located at the first end 22 of the bearing 20. In the embodiment shown in FIG. 1, the groove 57 defines a channel width T1. The groove is defined by opposing side walls 57W and a base 57B extending between the opposing side walls 57W, as shown in FIG. 3A. As best shown in FIG. 2B, the first end 73 of the composite annular seal assembly 70 defines a thickness T2, wherein T2 includes a thickness T5 of the first annular retaining ring 72, a thickness T6 of the second annular retaining ring 74 and a thickness T4 of the resilient ring 76. In one embodiment, T1 is greater than T2 to allow the first end 73 of the seal 70 to be snap-fit and retained in the groove 57 between the side walls 57W. The snap-fit is accomplished by laterally deflecting the composite annular seal 70 so that the first end 73 thereof is deflected radially inward to clear the lip 50KL and allow the first end 73 to snap into the groove 57, as described further herein with reference to FIG. 4.

While the composite annular seal assembly 70 is described as being seated and secured in the groove 57 using a snap-fit assembly, the present invention is not limited in this regard as other means for securing the composite annular seal assembly 70 in the groove 57, such as for example, installing the first end 73 of the composite annular seal assembly 70 in the groove 57 by using an adhesive, or some other known means, may be used without departing from the broader aspects of the invention.

The inner radial end 76Y of the resilient ring 76 slidingly engages (i.e., laterally and circumferentially) the inner race surface 36 of the inner race 30 adjacent to the first end 22 of the bearing 20 when the first composite annular seal assembly 70 is received in the groove 57 and the inner race 30 is disposed in the outer race 50. As described above, the first end 73 of the composite annular seal assembly 70 is received in the radial groove 57 defined in the outer race 50. As a result, the resilient ring 76 and the first and second retainers 72, 74 are axially secured inside the groove 57. The composite annular seal assembly 70 exhibits a tolerance stack-up such that retention inside the groove 57 by additional means is not necessary. However, use of such additional means for axial retention of the resilient ring 76 and the first and second annular retaining rings 72, 74 inside the groove 57, such as use of adhesives, is considered within the scope of the invention. Similarly, the resilient ring 76 is retained between the first and second annular retaining ring 72 and 74 by the press fit inside the groove 57 such that additional means is not necessary. However, use of such additional means for retaining the resilient ring 76 between the first and second annular retaining ring 72 and 74, such as us of adhesives or mechanical fasteners, is considered within the scope of the invention.

The resilient ring 76 is more compressible and flexible than the first annular retaining ring 72 and the second annular retaining ring 74. For example, resilient ring 76 is made from polytetrafluoroethylene (PTFE) and the first annular retaining ring 72 and the second annular retaining ring 74 are metallic. In one embodiment the first annular retaining ring 72 and the second annular retaining ring 74 are manufactured from a metal sheet stock, for example, stainless steel sheet stock and plain carbon steel sheet stock. However, the present invention is not limited in this regard as any materials may be used for the resilient ring 76, the first annular retaining ring 72 and the second annular retaining ring 74 without departing from the broader aspects disclosed herein.

Depending on the size of the bearing 20, the thickness T4 of the resilient ring 76 is between about 0.010 inch and about 0.064 inch. In one embodiment, the thickness T5 of the first annular retaining ring 72 and the thickness T6 of the second annular retaining ring 74 are each about 00.008 inch to about 0.063 inch.

The second composite annular seal assembly 80 is similar in design and construction to the first composite annular seal assembly 70, and is therefore not described in detail herein. Although the hourglass bearing is shown as having a first raceway 44 and a second raceway 46, the present invention is not limited in this regard, and the composite annular seal assembly in accordance with the present invention may by employed on an hourglass roller bearing having only a single row of rollers. It has been discovered that the benefit of the disclosed composite annular seal assembly design is that it facilitates the oscillatory movement of the bearing 20, while remaining stable and in position.

Figure 4:
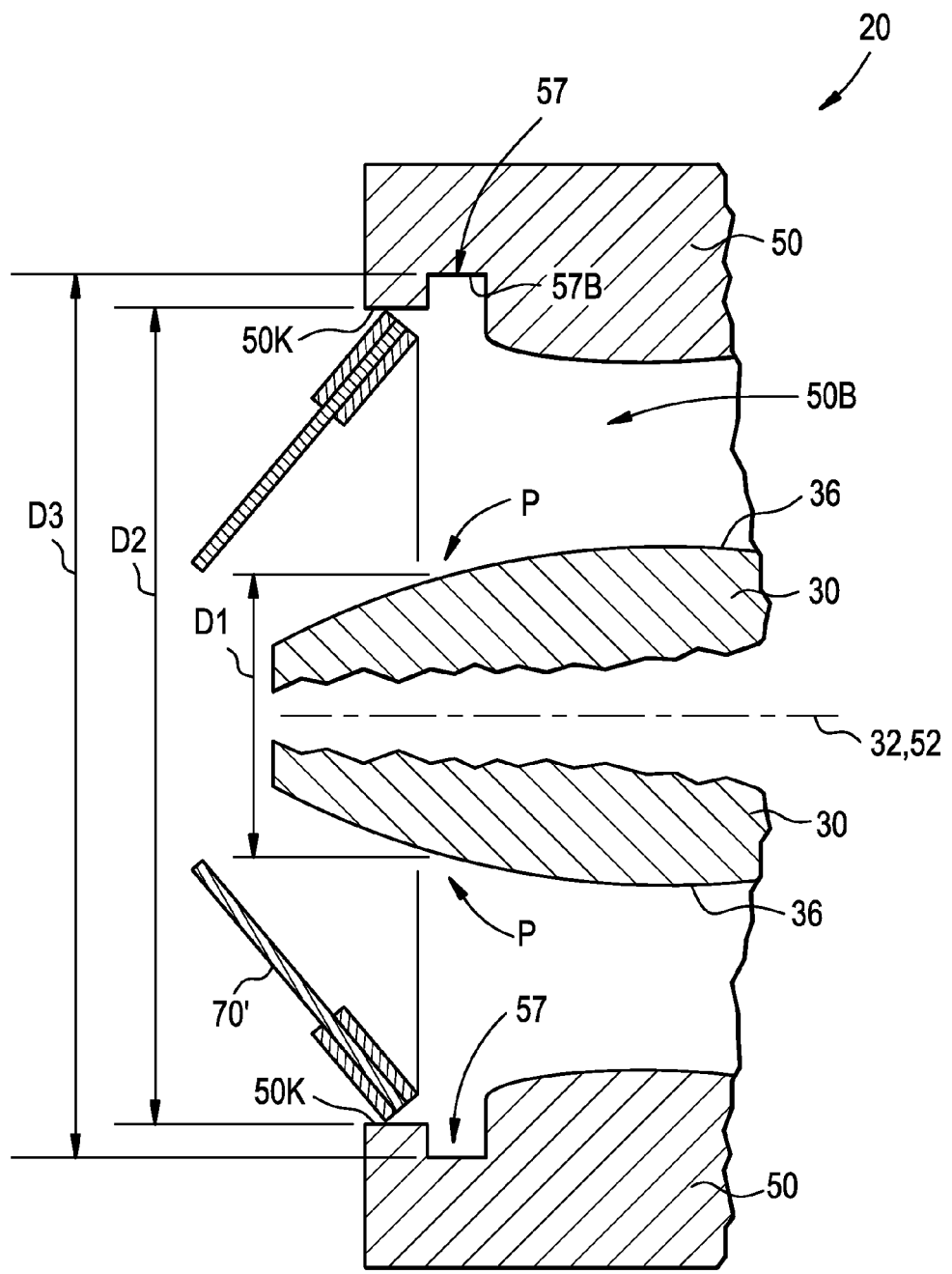
FIG. 4 is a cross sectional view of the bearing of FIG. 1 with the composite seal assembly shown in a laterally deflected state during installation into the bearing.

Referring to FIG. 4, the groove 57 has a diameter D3 measured between opposing base portions 57B. A diameter D1 is defined between points of contact P of the inner radial end 76Y of the resilient seal 76 with the inner race surface 36. The outer race 50 defines the lip 50K axially outward from the groove 57. The lip 50K defines a bore 50B having a diameter D2. As shown in FIG. 2A, the composite annular seal assembly 70 has an outside diameter D4 and the resilient ring 76 has an inside diameter D5. In one embodiment, the diameter D2 of the bore 50B is less than the diameter D4 of the composite annular seal assembly 70 to allow the composite annular seal assembly 70 to be laterally elastically deformed, for example, by laterally deflecting the composite annular seal 70 into a deflected state as indicated by element number 70' in FIG. 4 so that the first end 73 thereof is deflected radially inward to clear the lip 50K and allow the first end 73 to be snap-fit into the groove 57. While the composite annular seal assembly 70 is shown and described as being seated in a portion of the outer race 50 and slidingly engaging the inner race 30, and having the resilient ring 76 extending from the third radially outermost portion 76X radially inward to an inner radial end 76Y, the inner radial end 76Y being positioned radially inward from an inner radial end 72Y of the first annular retaining ring 72 and being positioned radially inward from an inner radial end 74Y of the second annular retaining ring 74, the present invention is not limited in this regard. For example, the composite annular seal 170 of FIG. 3B may be employed. The bearing 120 and composite annular seal 170 of FIG. 3B are similar to the bearing 20 and composite annular seal 70 of FIG. 3A, therefore like elements are assigned like reference numbers preceded by the numeral 1. The resilient ring 176 extends from a radially inner most portion 176X radially outward to an outer radial end 176Y. The outer radial end 176Y is positioned radially outward from an outer radial end 172Y of the first annular retaining ring 172 and is positioned radially outward from an outer radial end 174Y of the second annular retaining ring 174. The composite annular seal 170 is seated in the groove 158 and the radially outer most portion 176Y of the resilient ring 176 slidingly engages in the groove 157. In one embodiment, the composite annular seal has a radial slit therein, for example, across the first annular retaining ring 172, the second annular retaining ring 174 and/or the resilient ring 176, to facilitate installation into the groove 158. The composite annular seal 170 is similar to the composite annular seal 70 shown and described herein with regard to thickness and materials. While the radially outer most portion 176Y of the resilient ring 176 is shown and described as slidingly engaging the groove 157, the present invention is not limited in this regard as the groove 157 may be eliminated and the radially outer most portion 176Y of the resilient ring 176 may slidingly engage the outer race surface 154, as shown in FIG. 3C.

Figure 6:
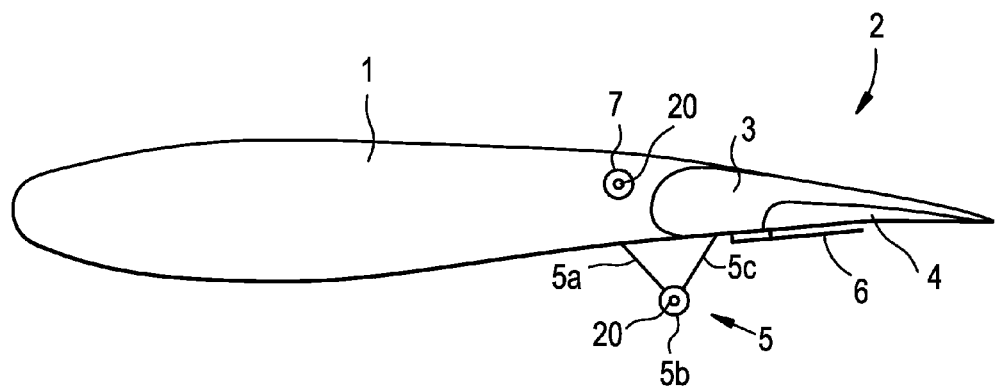
FIG. 6 illustrates schematically a cross section through an aircraft wing having a trailing edge flap arrangement in accordance with the invention shown in its retracted position.

Referring to FIG. 6, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement 5 includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 6 for translational movement relative to the main flap element 3. The hinge point 5b has one of the bearings 20 (as described herein with reference to FIGS. 1-5) mounted therein. The bearing 20 includes the seal assembly 80 disposed therein as described herein with reference to FIGS. 1-5. While the hinge point 5b is described as having one of the bearings 20 therein, the present invention is not limited in this regard as any number of the bearings 20 may be employed in the hinge point 5b. In one embodiment, the hinge point 5b has two of the bearings 20 installed therein; and in another embodiment, the hinge point 5b has two of the bearings 20 installed therein wherein the bearings 20 comprise different sized bearings.

FIG. 6 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element 4 is in its retracted, stowed position. As further shown in FIG. 6, the main flap element 3 includes an actuator 7 (e.g., a linear or a rotary actuator), which is connected by a linkage arrangement (not shown) to the main flap element 3. In one embodiment, the actuator 7 has one of the bearings 20 (as described herein with reference to FIGS. 1-5) disposed therein. While the actuator 7 is described as having one of the bearings 20 therein, the present invention is not limited in this regard as any number of the bearings 20 may be employed in the actuator 7. For example, two bearings 100 are employed in a linear actuator. The bearing 20 includes the seal assembly 80 disposed therein as described herein with reference to FIGS. 1-5. The actuator 7 provides for movement of the main flap element 3 relative to the fixed wing portion 1. In one embodiment, the actuator 7 provides for movement of the drop hinge linkage arrangement 5 which, in turn, provides for movement of the main flap element 3 relative to the fixed wing portion 1.

Figure 7:
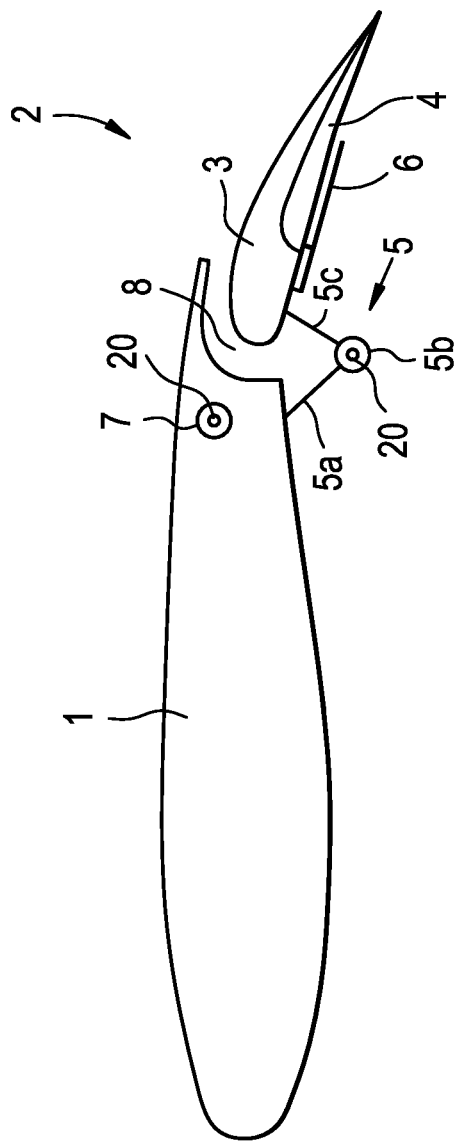
FIG. 7 illustrates the aircraft wing with the flap arrangement partially deployed.

FIG. 7 illustrates the flap arrangement 2 in its partially extended position. The main flap element 3 is deployed by rotating it downwardly using the drop hinge mechanism 5. Movement of the main flap element 3 is effected by the rotary actuator 7 and the bearing 20 installed therein. As can be seen from FIG. 7, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 7 enables high pressure air from the lower wing surface to pass through the slot 8 to energize the boundary layer over the upper surface of the main flap element 3 so as to postpone stall in a conventional manner. The single slotted trailing edge flap arrangement 2 is configured for use with an aircraft such as, for example, an Airbus® A-350® aircraft.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An edge flap arrangement for an aircraft wing, the arrangement comprising:
    a main flap element and an actuator for moving the main flap element relative to the aircraft wing;
    a linkage arrangement supporting the main flap element from the aircraft wing for movement relative to the aircraft wing, the linkage arrangement including a drop hinge link arrangement, the drop hinge link arrangement including a fixed strut secured to the aircraft wing and a drop link secured to the main flap element, the fixed strut and the drop link being pivotally connected by a hinge point;
    the hinge point comprising at least a first bearing, the first bearing comprising:
an outer race having a first inner surface and an interior area, a radially inward facing groove adjacent to the first inner surface;
    an inner race having an outer surface, a portion of the inner race being disposed in the interior area;
    an annular seal assembly being circumferentially continuous and laterally deflectable and thereby snap-fit into the groove, the annular seal assembly being configured to withstand relative misalignment between the inner race and the outer race, the annular seal assembly comprising:
    a first annular retaining ring defining a first radially outermost portion;
    a second annular retaining ring defining a second radially outermost portion; and
    a resilient ring defining a third radially outermost portion, the resilient ring being disposed between the first annular retaining ring and the second annular retaining ring;
    the first radially outermost portion, the second radially outermost portion and the third radially outermost portion being aligned with one another;
    the resilient ring projecting radially inward from the first annular retaining ring and the second annular retaining ring; and
    the resilient ring being more compressible and flexible than the first annular retaining ring and the second annular retaining ring.

2. The edge flap arrangement of claim 1, further comprising:
    at least a second bearing installed in the actuator for moving the main flap element relative to the aircraft wing, the at least one second bearing comprising:
    an outer race having a first inner surface and an interior area;
    an inner race having an outer surface, a portion of the inner race being disposed in the interior area;
    an annular seal assembly snap-fit into the outer race, the annular seal assembly comprising:
    a first annular retaining ring defining a first radially outermost portion;
    a second annular retaining ring defining a second radially outermost portion; and
    a resilient ring defining a third radially outermost portion, the resilient ring being disposed between the first annular retaining ring and the second annular retaining ring;
    the first radially outermost portion, the second radially outermost portion and the third radially outermost portion being aligned with one another;
    the resilient ring projecting radially inward from the first annular retaining ring and the second annular retaining ring; and
    the resilient ring being more compressible and flexible than the first annular retaining ring and the second annular retaining ring.

3. The edge flap arrangement of claim 1 wherein the hinge point comprises a plurality of first bearings.

4. The edge flap arrangement of claim 2 wherein the actuator comprises a plurality of second bearings.

5. The edge flap arrangement of claim 1 wherein the edge flap is for a trailing edge of a wing of an aircraft.

6. The edge flap arrangement of claim 1 wherein the aircraft has two engines, up to 7,950 nautical mile flying range, up to a 64.7 meter wingspan and employs at least 50 percent of composites in the fuselage and wing.

7. The edge flap arrangement of claim 1, the first bearing further comprising:
    a plurality of first hourglass rollers, each of the plurality of first hourglass rollers having a generally concave outer surface, the plurality of first hourglass rollers being disposed between the inner race and the outer race;
    the first inner surface being convex and the outer surface being convex; and
    each of the plurality of first hourglass rollers engaging the outer surface and the first inner surface.

8. The edge flap arrangement of claim 7, the first bearing further comprising:
    a second inner surface defined by the outer race, the second inner surface being convex;
    a plurality of second hourglass rollers, each of the plurality of second hourglass rollers having a generally concave outer surface, the plurality of second hourglass rollers being disposed between the inner race and the outer race; and
    each of the plurality of second hourglass rollers engaging the outer surface and the second inner surface.

9. The edge flap arrangement of claim 2, the second bearing further comprising:
    a plurality of first hourglass rollers, each of the plurality of first hourglass rollers having a generally concave outer surface, the plurality of first hourglass rollers being disposed between the inner race and the outer race;
    the first inner surface being convex and the outer surface being convex; and
    each of the plurality of first hourglass rollers engaging the outer surface and the first inner surface.

10. The edge flap arrangement of claim 9, the second bearing further comprising:
    a second inner surface defined by the outer race, the second inner surface being convex;
    a plurality of second hourglass rollers, each of the plurality of second hourglass rollers having a generally concave outer surface, the plurality of second hourglass rollers being disposed between the inner race and the outer race; and
    each of the plurality of second hourglass rollers engaging the outer surface and the second inner surface.

11. A bearing installed in a wing flap actuator of an aircraft, the bearing comprising:
    an outer race having a first inner surface and an interior area, a radially inward facing groove adjacent to the first inner surface;

an inner race having an outer surface, a portion of the inner race being disposed in the interior area;

an annular seal assembly being circumferentially continuous and laterally deflectable and thereby snap-fit into the groove, the annular seal assembly being configured to withstand relative misalignment between the inner race and the outer race, the annular seal assembly comprising:

a first annular retaining ring defining a first radially outermost portion;

a second annular retaining ring defining a second radially outermost portion; and a resilient ring defining a third radially outermost portion, the resilient ring being disposed between the first annular retaining ring and the second annular retaining ring;

the first radially outermost portion, the second radially outermost portion and the third radially outermost portion being aligned with one another;

the resilient ring projecting radially inward from the first annular retaining ring and the second annular retaining ring; and the resilient ring being more compressible and flexible than the first annular retaining ring and the second annular retaining ring.

12. The bearing according to claim 11 wherein the wing flap is for a trailing edge of a wing of an aircraft.

13. The edge flap arrangement of claim 1, wherein the groove defines a lip axially outward therefrom, the lip having an inside diameter and the annular seal assembly defines an outside diameter and the outside diameter is of a magnitude less than the inside diameter sufficient to allow the lateral deflectability of the annular seal assembly.

14. The edge flap arrangement of claim 11, wherein the groove defines a lip axially outward therefrom, the lip having an inside diameter and the annular seal assembly defines an outside diameter and the outside diameter is of a magnitude less than the inside diameter sufficient to allow the lateral deflectability of the annular seal assembly.

* * * * *